United States Patent
Bill et al.

(10) Patent No.: US 8,746,276 B2
(45) Date of Patent: Jun. 10, 2014

(54) PROPORTIONAL THROTTLE VALVE

(75) Inventors: Markus Bill, Heusweiler (DE); Peter Bruck, Althornbach (DE)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 0 days.

(21) Appl. No.: 13/138,937

(22) PCT Filed: Mar. 10, 2010

(86) PCT No.: PCT/EP2010/001477
§ 371 (c)(1),
(2), (4) Date: Oct. 27, 2011

(87) PCT Pub. No.: WO2010/124763
PCT Pub. Date: Nov. 4, 2010

(65) Prior Publication Data
US 2012/0037829 A1 Feb. 16, 2012

(30) Foreign Application Priority Data

Apr. 30, 2009 (DE) .................... 10 2009 019 552

(51) Int. Cl.
*F16K 31/14* (2006.01)
(52) U.S. Cl.
USPC ........ 137/495; 137/490; 137/491; 251/30.02; 251/129.07; 251/129.08
(58) Field of Classification Search
USPC .................... 137/490, 491; 251/30.02–30.04, 251/129.07, 129.08, 129.15
See application file for complete search history.

(56) References Cited

U.S. PATENT DOCUMENTS

| | | | | |
|---|---|---|---|---|
| 2,916,048 A | * | 12/1959 | Gunkel | 137/544 |
| 3,015,341 A | * | 1/1962 | Hedlend et al. | 137/493 |
| 3,145,730 A | * | 8/1964 | Presnell | 137/493.2 |
| 3,250,293 A | * | 5/1966 | Adams et al. | 137/528 |
| 3,788,597 A | * | 1/1974 | Ichioka | 251/129.08 |
| 3,972,345 A | * | 8/1976 | Court | 137/490 |
| 4,305,566 A | * | 12/1981 | Grawunde | 251/30.02 |
| 4,553,732 A | * | 11/1985 | Brundage et al. | 251/30.01 |
| 4,716,927 A | * | 1/1988 | Vayra | 137/490 |
| 4,848,721 A | * | 7/1989 | Chudakov | 251/30.02 |
| 4,860,788 A | | 8/1989 | Asaoka | |
| 5,447,174 A | | 9/1995 | Bourkel et al. | |
| 5,938,170 A | | 8/1999 | Shimada et al. | |

(Continued)

FOREIGN PATENT DOCUMENTS

DE 38 03 487 8/1989
DE 10 2005 014 101 12/2005

(Continued)

*Primary Examiner* — John K Fristoe, Jr.
*Assistant Examiner* — Matthew W Jellett
(74) *Attorney, Agent, or Firm* — Roylance, Abrams, Berdo & Goodman, L.L.P.

(57) ABSTRACT

A proportional throttle valve includes a valve piston (2) displaceably guided in the longitudinal direction in a valve housing (3) having a fluid inlet (4) and a fluid outlet (5) and pretensioned by an energy accumulator, in particular in the form a pressure spring, against a stroke stop (6) defining the closure position. A pressure limiting valve (7) is integrated in the proportional throttle valve (1). The side (8) of the valve piston (2) to allow the piston to move away from the stroke stop (6) in opposition to the pretensioning force when a predefinable pressure is exceeded at the fluid inlet (4).

11 Claims, 1 Drawing Sheet

(56) References Cited

U.S. PATENT DOCUMENTS

| | | | |
|---|---|---|---|
| 6,021,996 A * | 2/2000 | Nakayoshi | 251/30.02 |
| 6,073,652 A * | 6/2000 | Wilke et al. | 137/596.16 |
| 6,824,120 B2 * | 11/2004 | Furuta et al. | 251/355 |
| 7,007,925 B2 * | 3/2006 | Nordstrom et al. | 251/129.15 |
| 8,365,763 B2 * | 2/2013 | Woelfges | 137/491 |
| 2004/0244838 A1 * | 12/2004 | Stroud | 137/490 |
| 2005/0178443 A1 * | 8/2005 | Cheong | 137/491 |
| 2006/0011878 A1 * | 1/2006 | Denyer et al. | 251/129.08 |
| 2009/0072174 A1 | 3/2009 | Makino | |

FOREIGN PATENT DOCUMENTS

| | | |
|---|---|---|
| DE | 10 2005 023 547 | 7/2006 |
| DE | 10 2007 005 465 | 8/2007 |
| DE | 10 2006 053 136 | 5/2008 |

* cited by examiner

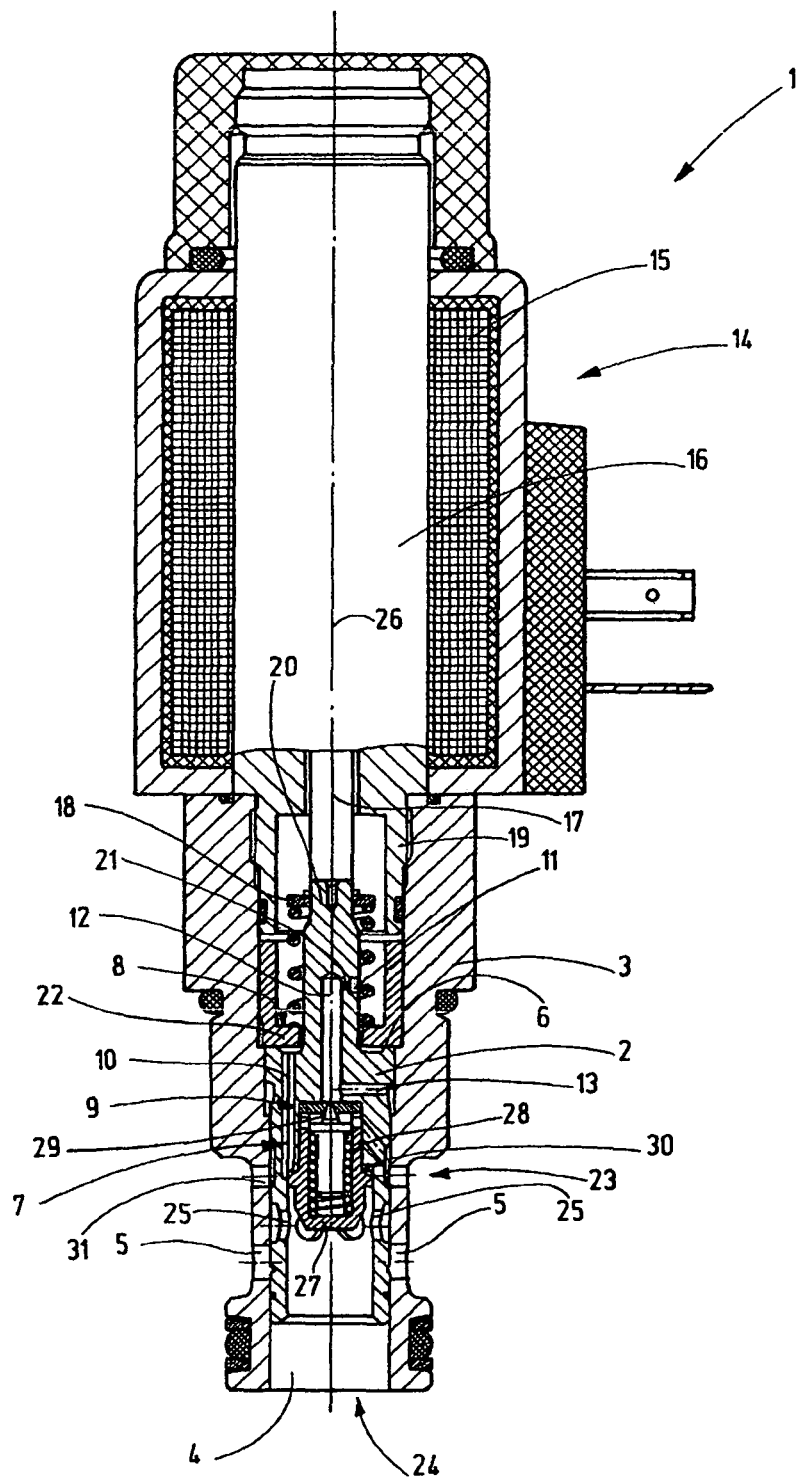

PROPORTIONAL THROTTLE VALVE

FIELD OF THE INVENTION

The invention relates to a proportional throttle valve comprising a valve piston movably guided in the longitudinal direction in a valve housing having a fluid inlet and a fluid outlet and pretensioned by an energy accumulator, in particular in the form of a compression spring, against a stroke stop defining the closed position.

BACKGROUND OF THE INVENTION

Proportional throttle valves are often used when the level of the fluid flow passing through these valves is to be continuously changed as a function of a prevailing magnetic flow of a coil actuating the valve piston. With a slide valve, the opening cross section is dependent on the piston position. If the coil is supplied with an electrical current, a magnetic force proportional to the magnetic flow is generated. As a result of the magnetic force, the valve piston can be moved into an open position. A spring located on the back side of the valve piston is generally tensioned, with its spring force opposing the magnetic force. If an equilibrium is established between the magnetic force and the spring force, the valve piston remains in its position.

The proportional throttle valve is largely independent of the pressure level to be controlled because the valve piston is pressure-equalized by the pressure prevailing on the two end surfaces as well as in the pilot chamber.

Proportional throttle valves are used, for example, in lifting-lowering applications, such as in industrial trucks. In these applications, a 2/2 directional valve is typically used in the lifting-lowering motion for lowering the load. At the same time, proportional throttle valves are used to control the volumetric flow. To protect the entire system of these two valves, a pressure limiting valve is used in addition to limit the maximum pressure.

The known systems thus have a plurality of valves requiring the corresponding installation space.

SUMMARY OF THE INVENTION

An object of the invention is to provide an improved proportional throttle valve that integrates in itself several functions with respect to the lifting-lowering motion.

This object is basically achieved by a proportional throttle valve where the proportional throttle valve integrates a pressure limiting valve to facilitate influencing the fluid pressure on the back side of the valve piston for opening on the pertinent valve seat when a definable pressure is exceeded at the fluid inlet. A combination of the function of the proportional throttle valve with the pressure limiting valve is created helping save components and installation space compared to the prior art.

The pressure limiting valve is preferably integrated into the valve piston for functional coupling of the control lines. The control lines cause at least the fluid pressure at the fluid inlet of the proportional throttle valve to act on a valve seat, especially made in the form of a cone seat of the pressure limiting valve. The fluid pressure from the fluid inlet is applied via a radially offset axial bore in the valve piston to the back side of the valve piston via an orifice bore and a bore extending axially in the valve piston as well as via a radial bore draining from the radial bore to a pilot chamber of the valve. Thus pressure equalization is effected. This fluid pressure also acts at the same time on the valve seat of the pressure limiting valve. If the pressure exceeds the value set permanently on a valve spring of the pressure limiting valve, a control channel to the fluid outlet is cleared. The pilot volumetric flow is established at this point from the fluid inlet via the lateral axial bore in the valve piston. The back side of the valve piston as well as the orifice with the connected axial bore to the valve seat of the pressure limiting valve effects a pressure drop at the orifice. This reduced fluid pressure is signaled to the pilot chamber, from which a resulting force against the main spring of the valve piston results and moves the valve piston in the direction of an "open position" between the fluid inlet and the fluid outlet.

This mechanism of action is possible essentially both in the deenergized and in the energized state of the proportional throttle valve so that a continuously available pressure limitation situation is integrated into the proportional throttle valve.

Other objects, advantages and salient features of the present invention will become apparent from the following detailed description, which, taken in conjunction with the annexed drawings, discloses a preffered embodiment of the present invention.

BRIEF DESCRIPTION OF THE DRAWINGS

Referring to the drawing which forms a part of this disclosure and which is schematic and not to scale:

FIG. 1 is a side elevational view in section of a proportional throttle valve according to an exemplary embodiment of the invention.

DETAILED DESCRIPTION OF THE INVENTION

FIG. 1 illustrates a proportional throttle valve 1 directly controlled in terms of its fundamental design. In a magnet system housing, a magnet system 14 has an armature 16 actuatable by a DC coil 15. The magnet system 14 is designed as a pushing, path-controlled proportional magnet system. The armature 16 and an actuating element 17 dynamically connected to actuating element are moved down in the direction of a fluid inlet 4 in the energized state of the DC coil 15.

The actuating element 17 is dynamically connected to a valve piston 2 representing an orifice function. In the deenergized state of the DC coil 15, the armature 16 (not detailed), the actuating element 17 and the valve piston 2 are moved by a spring 18 in the direction of a stroke stop 6. This piston corresponds to the closed state of the proportional throttle valve and the closed state between fluid inlet 4 and fluid outlet 5. The armature 16 is mounted inside in the pole tube.

The magnet system housing with a cylindrical guide 19 is designed to project into a valve housing 3 and is sealed for this purpose relative to the exterior. The cylindrical actuating element 17 likewise projects into the cylindrical guide 19 and has a detachable positive connection to a prolongation 20 of the valve piston 2. Prolongation 20 guides the spring 18 on the mandrel side. The prolongation 20 undergoes transition through a cylindrical space 21 with a bottom 22 defining the stroke stop 6 into the valve piston 2 configured as an "orifice piston." The stroke stop 6 separates the back side 8 of the valve piston 2 from its main control section 23.

The valve piston 2 has the main control section 23 for triggering the flow rate from the fluid inlet 4 to the fluid outlet 5. For this purpose, the main control section 23 has an inlet opening 24 and radial outlet openings 25. As a function of the positioning motion of the armature 16 of the magnet system 14, the outlet openings 25 can be caused to partially or completely line up with the fluid outlet 5 on the valve housing 3 when the valve piston 2 is moved in the direction of the fluid inlet 4.

In order to be able to superimpose a pressure limitation function on the volumetric flow control function of the proportional throttle valve 1, the main control section 23 of the valve piston 2 has an inner bore concentric to its longitudinal axis 26 and receiving a pressure limiting valve 7. The pressure limiting valve 7 has a cylindrical housing 27 in which a valve cone 29 is placed on a valve seat 9 and is pretensioned by a compression spring 28. The housing 27 of the pressure limiting valve 7 is permanently or fixedly connected to the sleeve-shaped main control section 23 of the valve piston 2 and is guided to be able to move in the longitudinal direction with valve piston 2. Within the framework of the fluid to be routed, the main control section 23 thus communicates with different control bores for triggering, especially relating to the fluid pressure on the back side 8 of the valve piston 2.

As a rule, a boundary pressure, which can be set via a compression spring 28 at the fluid inlet 4, causes an actuation of the valve piston 2 for displacement motion of the valve piston 2 in the direction to the fluid inlet 4 and enables a volumetric flow to pass through the proportional throttle valve 1.

The pressure at the fluid inlet 4 is transferred via an axial bore 10, which axial bore is radially offset in the main control section 23, to the back side 8 into the spring space 21. The axial bore 10 in the region of the stroke stop 6 discharges from the valve piston 2. Out of the spring space, the pressure propagates via an orifice bore 11 in prolongation 20 via a bore 12. This pressure is routed in this prolongation 20 through bore 12 closed by the valve cone 29 of the pressure limiting valve 7. At a small axial distance from the valve cone, a radial bore 13 branches off from the bore 12 and leads into a pilot chamber (not detailed) resulting in the main piston or valve piston 2 being pressure-equalized.

If at this point the pressure at the fluid inlet 4 exceeds a definable value, the valve cone 29 opens the valve seat 9 of the pressure limiting valve 7. Fluid can then flow via an obliquely radially routed branch duct 30 through the housing 27 of the pressure limiting valve 7 and the wall of the main control section 23 to a secondary connection 31 connected to a pressure medium tank. On the orifice 11 of the bore 12 on the back side of the piston in the spring space 21, a pressure drop arises and propagates to the pilot chamber. This pressure drop results in the valve piston 2 moving in the direction of the fluid inlet 4 and in enabling a flow connection to the fluid outlet 5.

The described combination valve can replace the independent pressure limiting valve of the prior art to protect the system pressure by the integration of the pressure limiting function into the proportional throttle valve. As a result, an expensive valve can be completely omitted. In addition, a cost reduction can be achieved by a simplified "drilling" in the control block (eliminating valve installation space and various connecting bores), and installation space on site can be saved. In particular, for applications in which a pressure limitation, which is variable depending on the operating state of the lifting means, is desired and is implemented electronically, the valve according to the invention is suitable for implementation of an additional mechanical protection for safety reasons in case of a fault in the electrical control circuit. In the electronic pressure limitation function, the pressure is detected via pressure sensors and evaluated by a control electronics system that, when a pressure is exceeded, electrically actuates the proportional valve, and thus, the opening cross section is set such that the pressure at the fluid inlet 4 is kept constant according to the setpoint stipulation. This setting is critical, based on safety-relevant aspects and, in addition, should be mechanically protected for protection of the system components, for which a conventional pressure limiting valve (not shown) would also be necessary, but can be omitted at this point within the scope of the inventive solution.

While one embodiment has been chosen to illustrate the invention, it will be understood by those skilled in the art that various changes and modifications can be made therein without departing from the scope of the invention as defined in the appended claims.

What is claimed is:

1. A proportional throttle valve, comprising
   a valve housing having a fluid inlet and a fluid outlet;
   a valve piston movably guided in a longitudinal direction in said valve housing;
   a compression spring pretensioning said valve piston against a stroke stop defining a closed position;
   a pressure limiting valve integrated in said valve housing and in said valve piston and exposed to fluid pressure on a back side of said valve piston to move away from said stroke stop in opposition to pretensioning of said compression spring when a definable pressure is exceeded at said fluid inlet, fluid pressure at said fluid inlet acting on a valve seat of said pressure limiting valve and being routed via a radially offset axial bore in said valve piston to said back side of said valve piston via an orifice, a piston bore extending axially in said valve piston and a radial bore in said valve piston to a pilot chamber for pressure balancing of said valve piston; and
   an actuating magnet directly coupled to said valve piston.

2. A proportional throttle valve according to claim 1 wherein
   the fluid pressure at said fluid inlet prevails on said valve seat of said pressure limiting valve and opens said pressure limiting valve when the definable pressure is reached to produce a pressure drop at said orifice and to cause a resulting force on said valve piston displacing said valve piston to connect said fluid inlet to said fluid outlet.

3. A proportional throttle valve according to claim 1 wherein
   said pressure limiting valve maintains functioning relative to said valve piston in a deenergized state of an actuating magnet system coupled to said valve piston.

4. A proportional throttle valve according to claim 1 wherein
   said actuating magnet comprises a magnetic coil and an actuating element movably mounted therein, said actuating element being coupled to said valve piston to move said valve piston in said valve housing upon energizing said magnetic coil in opposition to said pretensioning of said compression spring from the closed position to an open position.

5. A proportional throttle valve according to claim 4 wherein
   said actuating magnet comprises a magnetic housing with a cylindrical guide projecting into said valve housing and sealed thereto, said actuating element projecting into said cylindrical guide.

6. A proportional throttle valve according to claim 5 wherein
   said valve piston comprises a prolongation connected to said actuating element.

7. A proportional throttle valve according to claim 6 wherein
   said compression spring surrounds said prolongation a space in said valve housing, said space having a bottom defining said stroke stop, said stroke stop separating said back side of said valve piston from a main control section of said valve piston controlling fluid flow through said fluid inlet and said fluid outlet.

8. A proportional throttle valve according to claim 7 wherein said pressure limiting valve comprises a limiting valve housing fixedly connected in said valve piston and extending concentrically along a longitudinal axis of said valve piston, a valve member movably mounted in said limiting valve housing along said longitudinal axis to engage with and to disengage from said valve seat and a limiting compression spring biasing said valve member against said valve seat.

9. A proportional throttle valve according to claim 8 wherein said valve seat is adjacent an end of said piston bore and has an opening therein providing fluid communication between said piston bore and said fluid outlet via passages in said housing when said valve member is disengaged from said valve seat.

10. A proportional throttle valve according to claim 1 wherein said pressure limiting valve comprises a limiting valve housing fixedly connected in said valve piston and extending concentrically along a longitudinal axis of said valve piston, a valve member movably mounted in said limiting valve housing along said longitudinal axis to engage with and to disengage from said valve seat and a limiting compression spring biasing said valve member against said valve seat.

11. A proportional throttle valve according to claim 10 wherein said valve seat is adjacent an end of said piston bore and has an opening therein providing fluid communication between said piston bore and said fluid outlet via passages in said housings when said valve member is disengaged from said valve seat.

* * * * *